United States Patent [19]

Smirl

[11] 4,228,691
[45] Oct. 21, 1980

[54] VARIABLE PULLEY TRANSMISSION

[75] Inventor: Richard L. Smirl, Arlington Heights, Ill.

[73] Assignee: Borg-Warner Corporation, Chicago, Ill.

[21] Appl. No.: 773,358

[22] Filed: Mar. 1, 1977

[51] Int. Cl.³ .................................... F16H 55/52
[52] U.S. Cl. ............................... 474/12; 474/28
[58] Field of Search ............ 74/230.17 A, 230.17 F, 74/230.17 E, 230.17 M, 230.17 T, DIG. 1

[56] References Cited

U.S. PATENT DOCUMENTS

| | | | |
|---|---|---|---|
| 2,731,849 | 1/1956 | Rockwood et al. | 74/230.17 F |
| 2,794,349 | 6/1957 | Smirl | 74/DIG. 1 |
| 2,890,605 | 6/1959 | Smirl | 74/DIG. 1 |
| 2,908,181 | 10/1959 | Smirl | 74/DIG. 1 |
| 3,001,415 | 9/1961 | Smirl | 74/DIG. 1 |
| 3,263,782 | 8/1966 | Smirl et al. | 192/85 R |
| 3,395,586 | 8/1968 | Kirchner | 74/230.17 F |
| 3,451,283 | 6/1969 | Rattunde | 74/230.17 A |
| 3,596,528 | 8/1971 | Dittrich et al. | 74/230.17 F |
| 3,597,986 | 8/1971 | Bouthors | 74/230.17 F |
| 3,600,960 | 8/1971 | Karig et al. | 74/230.17 F |
| 3,600,961 | 8/1971 | Rattunde et al. | 74/230.17 F |
| 3,757,593 | 9/1973 | Svenson | 74/230.17 E |
| 3,893,344 | 7/1975 | Dantlgraber et al. | 74/230.17 F |
| 3,906,808 | 9/1975 | Zaiser et al. | 74/230.17 F |
| 4,020,711 | 5/1977 | Woollard | 74/230.17 A |

FOREIGN PATENT DOCUMENTS

| | | | |
|---|---|---|---|
| 1256023 | 12/1967 | Fed. Rep. of Germany | 74/230.17 F |
| 1264196 | 3/1968 | Fed. Rep. of Germany | 74/230.17 F |
| 1500486 | 7/1969 | Fed. Rep. of Germany | 74/230.17 F |
| 1936741 | 2/1971 | Fed. Rep. of Germany | 74/230.17 F |
| 2703487 | 11/1977 | Fed. Rep. of Germany | 74/230.17 F |
| 1304112 | 8/1962 | France | 74/230.17 F |

*Primary Examiner*—Samuel Scott
*Assistant Examiner*—Gerald A. Anderson
*Attorney, Agent, or Firm*—Aubrey L. Burgess

[57] ABSTRACT

A variable pulley transmission especially adaptable for use in a passenger vehicle which comprises driver and driven pulleys connected by a flexible belt, the spacing between the pulleys and thus the drive ratio being controlled by a hydraulic control arrangement which is both engine speed and torque responsive.

11 Claims, 12 Drawing Figures

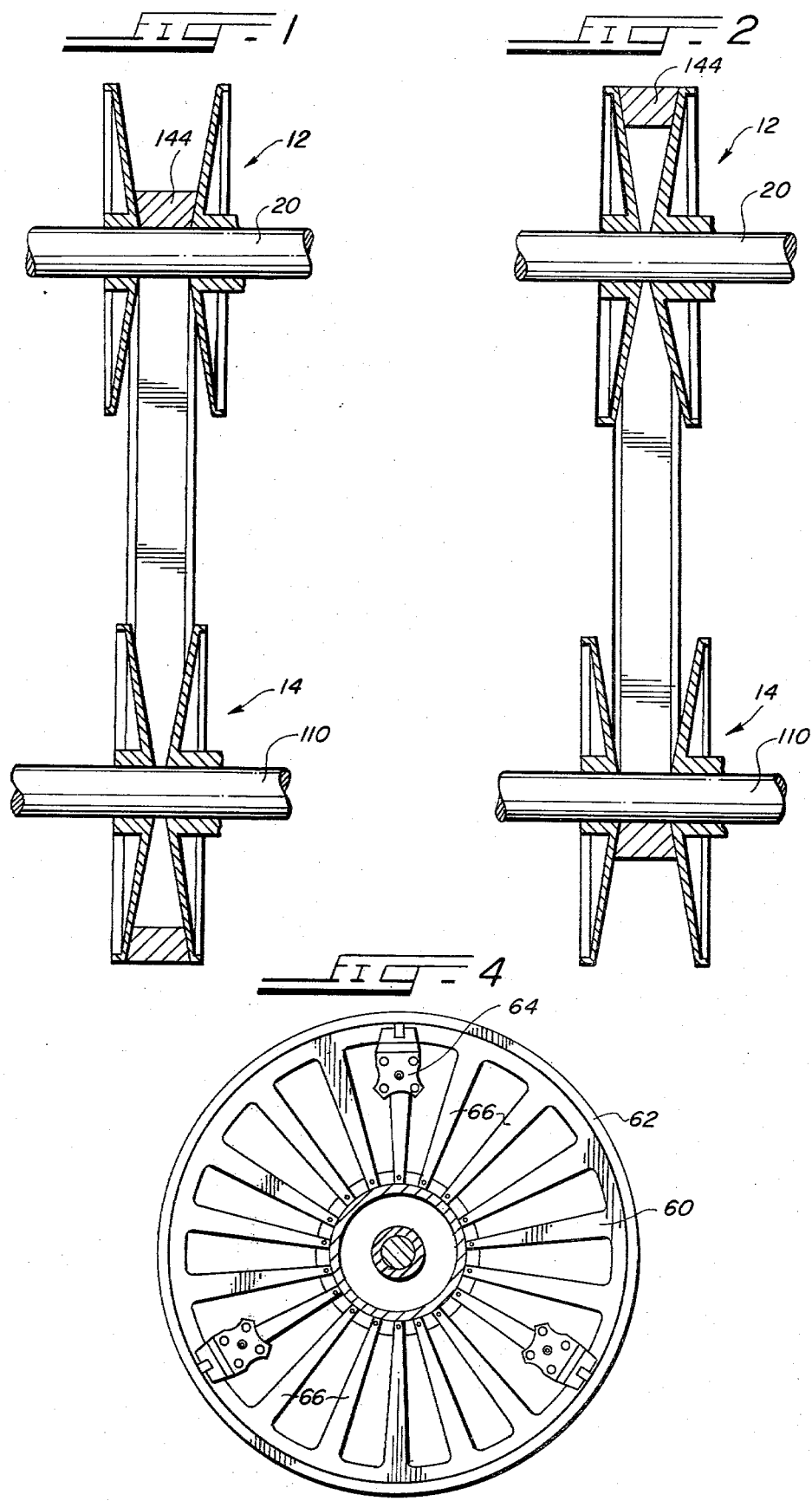

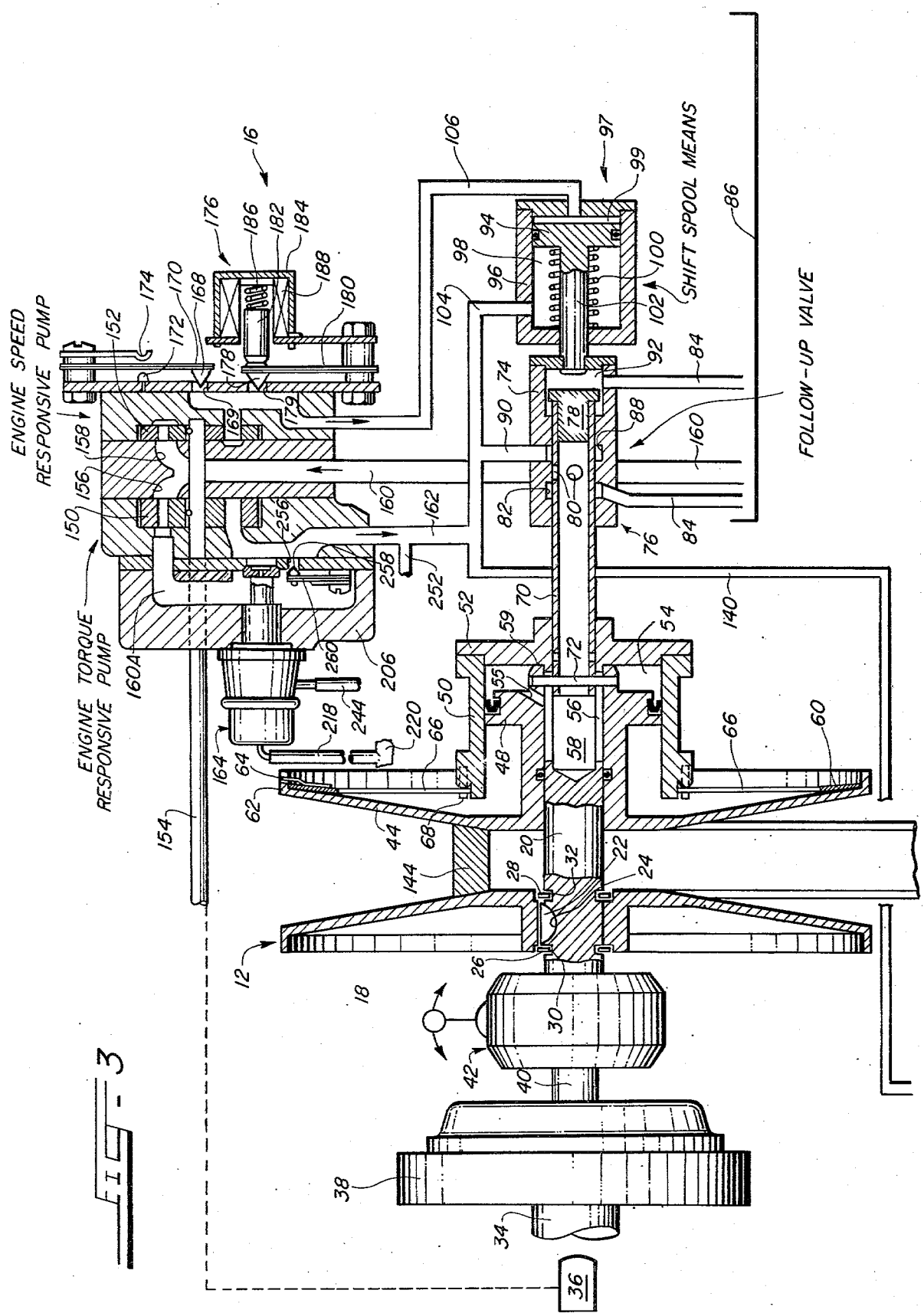

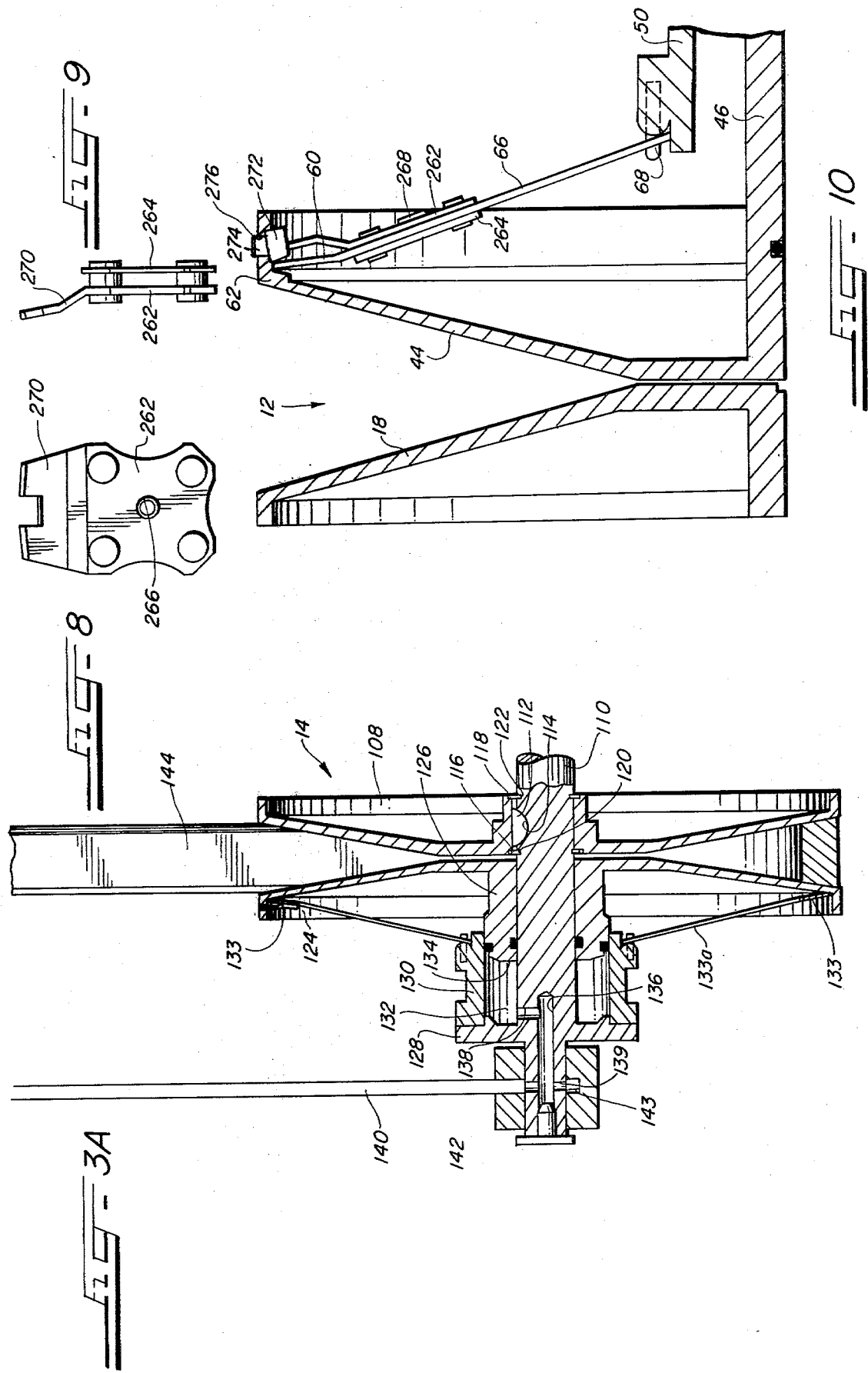

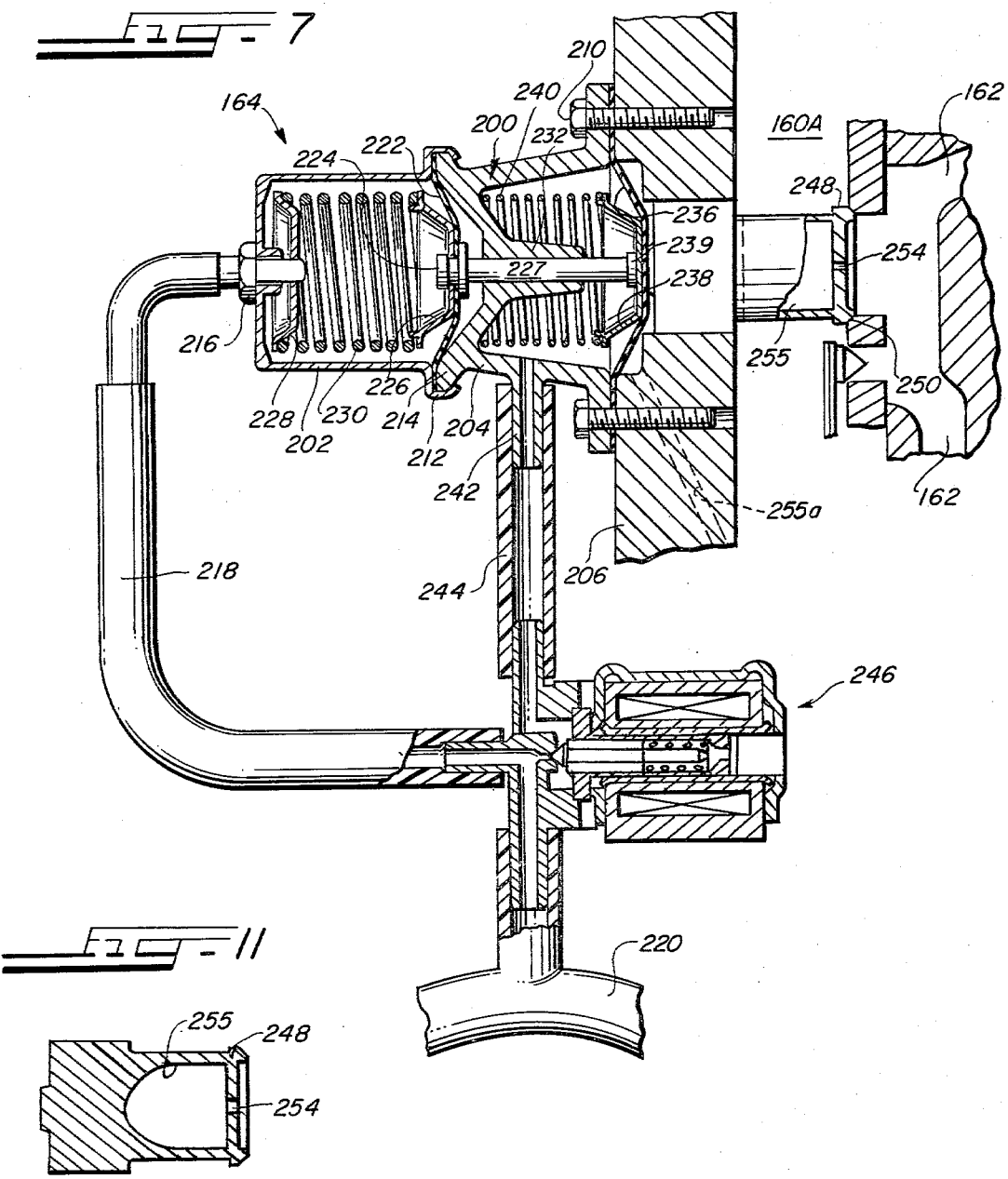
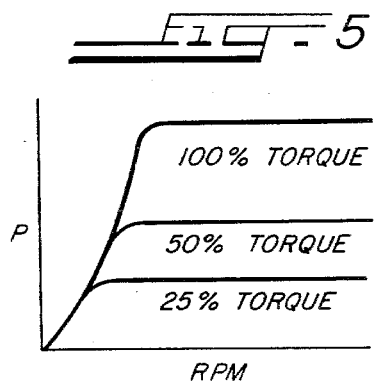
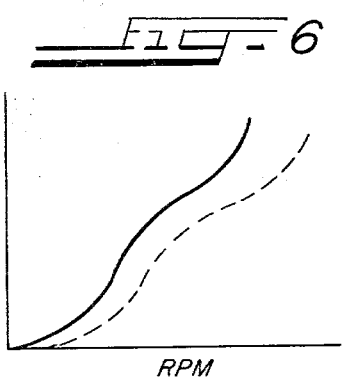

VARIABLE PULLEY TRANSMISSION

BACKGROUND OF THE INVENTION

Variable pulley transmissions are well known in the art; generally, the majority of prior art applications of such devices are for uses other than for passenger cars. Because of the energy crisis, coupled with the high price of fuel, emphasis is being placed on relatively low-powered, small, low-cost passenger vehicles which are capable of obtaining high mileage per gallon of fuel. For such usage, the variable pulley transmission is ideal. Additionally, such a transmission offers an unlimited number of speed ratios throughout its range.

THE INVENTION

The invention to be described relates to a variable speed belt drive system, especially constructed for a passenger car. It can, however, be adapted for other types of vehicles.

The system of this invention comprises generally a driveR pulley assembly of a fixed flange and an axially movable flange, and a driveN pulley assembly of a fixed flange and an axially movable flange, the pulleys being drivingly connected by a flexible belt.

There is also provided a hydraulic control system for the pulley assemblies which is both engine speed and engine torque responsive.

The driveR assembly is controlled by an automatic starting clutch from the internal combustion engine of the car through a forward-reverse mechanism, such as a gear set. The axially movable driveR flange is pre-loaded with a disc spring and finger structure which connects the rim of the movable flange to a hydraulic cylinder to carry torque between the flange and the cylinder. The hydraulic piston of the cylinder is fed with hydraulic pressure by a follow-up valve controlled by a shift spool or plunger.

The three devices, i.e., the hydraulic cylinder, the follow-up valve, and the shift spool control the axial position of the movable driveR flange and thereby the drive ratio of the transmission.

The driveN assembly comprises a disc spring with fingers which preloads the axially movable flange of the driveN pulley and which, together with a fluid or hydraulic pressure maintains the movable flange against the belt, so that the pulley carries the torque. The spring and fingers connect the movable flange to a driveN shaft, i.e., the shaft for driving the wheels of the vehicle. The hydraulic pressure and the load of the spring control the flange loading of the driveN assembly and thus control the torque capacity thereof.

One of the main objectives of this invention is to control the flange loading on the driveN pulley in such a manner that it closely matches the torque requirements of the belt connecting the driveR and driveN pulleys in the various drive positions and at the various input torque levels of the engine. The variation in flange loading with respect to flange position or belt ratio is controlled by the shape of the load deflection curve of the disc spring, such that when the belt is in the low drive ratio position, a relatively high spring load is exerted, and as the belt moves to the high drive ratio position, the load diminishes in a pronounced manner. In the preferred embodiment of this invention, the spring load in the high drive ratio position is less than half of the spring load in the low drive ratio position. The change in load with reference to input or engine torque is accomplished on the driveN pulley by variations in the hydraulic pressure applied to the piston connected to the movable flange of the driveN pulley. The combined force of the spring and the hydraulic pressure give a family of curves for each torque level of the drive.

THE DRAWINGS

FIG. 1 is a schematic illustration of a variable pulley transmission in low drive ratio or idle position;

FIG. 2 is a schematic illustration of a variable pulley transmission in high drive ratio position;

FIGS. 3 and 3a, when placed one above the other, illustrate, schematically the transmission and hydraulic control system of this invention;

FIG. 4 is a plan view of a disc spring-finger assembly of this invention illustrating its attachment to other parts of the transmission.

FIG. 5 is a curve of the output of one of the pumps of the hydraulic control system plotted against engine RPM;

FIG. 6 is a family of curves of the output of the other of the pumps of the hydraulic control system plotted against engine RPM;

FIG. 7 is a schematic of a torque responsive pressure control assembly;

FIGS. 8, 9 and 10 are details of the driving connection of the disc spring-finger assembly and a pulley; and FIG. 11 is a detail of a valve plunger in the pressure control assembly.

DETAILED DESCRIPTION

Looking at FIGS. 3 and 3A, there is illustrated schematically a variable pulley transmission assembly which comprises a driveR pulley 12, a driveN pulley 14 and a control system 16.

The driveR pulley 12 comprises a fixed flange 18 connected to a drive shaft 20 by a key 22 received in a keyway 24 in the shaft 20, and snap rings 26, 28 received in grooves 30, 32, respectively, in the shaft 20. Because of the connection, the fixed flange 18 rotates with the shaft 20. The shaft 20 is connected to a main drive shaft 34 driven by a prime mover, such as an internal combustion engine 36. The shaft 34 is connected to a starting clutch 38 (as for example, a clutch of the type described in U.S. Pat. No. 3,263,782) which in turn is connected by a shaft 40 to a forward-reverse mechanism 42 of any desirable construction. The forward-reverse mechanism 42 is connected to the shaft 20.

The driveR pulley 12 further comprises an axially movable flange 44 having a hub portion 46 surrounding the shaft 20, which hub portion 46 has a cylindrical piston portion 48 received in a cylindrical member 50 closed by an end member or cover 52 to define a chamber 54 communicating via passages 55 and slots 56 in the shaft 20 with a central, open-ended bore 58 also in the shaft 20. The piston 48 has a terminal end 59 which abuts the cover 52 when the driveR flange is in low ratio position.

A disc spring 60 (see also FIG. 4) is drivingly connected adjacent the outer rim 62 of the movable flange 44 by spaced connecting means 64; the spring 60 has radially inwardly projecting fingers 66, some of which are connected by pins 68 and the like to a portion of the member 50.

One end of a hollow tube 70 is received in the open-ended bore in the shaft 20 and is connected by a pin 72 to a portion of the hub 46 of the movable flange 44. The pin 72 passes through opposite slots in the shaft 20, permitting the tube 70 to be axially movable. Because of the pin connection, the hollow tube 70 as well as the entire movable flange assembly is rotatable with the shaft 20. The opposite end of the hollow tube 70 is slidably received in the block 74 of a speed and torque responsive follow-up valve 76 and is closed by a flanged plug 78. One or more (usually a plurality) ports 80 communicate from the outside to the interior of the hollow tube 70.

The block 74 has a first annular groove 82 connected to a drain conduit 84 opening to a sump 86, i.e., a supply of hydraulic fluid, such as oil, and a second annular groove 88 connected to a conduit 90. The flanged plug 78 is received in an enlarged cavity 92 in the block 74; the flange limiting the relative travel between the hollow tube 70 and the block 74.

A shift spool 94 is connected with the block 74 and is received in a stationary block 96 of a shift spool means 97. The spool 94 defines cavities 98 and 99 on the opposite sides thereof as shown. A coil spring 100 surrounds the connecting stem 102 of the spool 94, and the opposite ends of the block 96 are connected to conduits 104 and 106, respectively. The conduit 104 communicates with the cavity 98 and the conduit 106 communicates with the cavity 106.

The driveN pulley 14 comprises a fixed flange 108 connected to a driven or output shaft 110 by a key 112 received in a keyway 114 in the shaft 110, and snap rings 116, 118 received in grooves 120, 122, respectively, in the shaft 110, and an axially movable flange 124 having an axially extending hub 126 surrounding the shaft 110. The shaft 110 is provided with a radially extending flange 128 to which is connected a cylindrical member 130 surrounding the hub 126 and defining therewith a cavity 132. A disc spring 133 similar in construction to the spring 60 is drivingly connected at its periphery to the flange 124 and is fingers 133a engage the member 130. In order to provide sufficient loading of the flange 124, a double or triple parallel stacked spring may be used. The terminal end 134 of the hub 126 is exposed to the cavity 132, so that the hub 126 acts as a piston when fluid is introduced into the cavity 132. To introduce fluid into the cavity 132, the shaft 110 is axially bored at 136 and transversely bored at 138 and 139. The bore 136 is plugged at its terminal end and a conduit 140 is connected to a non-rotatable delivery sleeve 142 surrounding the shaft 110. An annular groove 143 in the sleeve 142 provides communication between the conduit 140 and the bores 136, 138 and 139.

A flexible belt 144 connects the driveR pulley 12 and the driveN pulley 14. The belt 144 can be constructed of metal or an elastomeric material reinforced with fiber glass or other cord tension members. The belt may be covered with a nylon or other cloth. Other belt constructions may be used, if desired. The flanges 108 and 124 of the driveN pulley never abut one another because there must always be a load on the belt 144 which is provided by the springfinger arrangement 133 and 133a and hydraulic pressure in the cavity 132.

The hydraulic control system 16 comprises a pair of positive displacement pumps 150, 152, preferably of the type known as internal-external gear pumps. One such known variety is sold under the Tradename "Gerotor". Other types of positive displacement pumps may be substituted without departing from the spirit of the invention. The pumps 150 and 152 are connected to and driven by a common drive shaft 154 which in turn is driven from the engine 36. The pump 150 delivers hydraulic fluid under a pressure which is engine torque responsive and will be referred to as "P" while the pump 152 delivers a hydraulic fluid under a pressure which is engine speed responsive and will be referred to as "G". The suction or inlet ports 156, 158 and 160A of the pumps 150, 152 are both connected by a conduit 160 to the sump 86. The outlet of the pump 150 is connected by a conduit 162 to the conduits 90, 104, and 140, previously mentioned. An engine manifold vacuum connected and torque responsive pressure control assembly 164 is associated with the conduit 162 and thus the pressure P is controlled by engine vacuum. As the vacuum increases, the assembly 164 varies the pressure at which hydraulic fluid is bypassed to the intake port 160A.

The pump 152 delivers hydraulic fluid under a pressure related to the engine speed by the conduit 106, previously described. A metering pin 168 registering with a metering orifice 169 is in the conduit 106. The pin 168 is supported by a cantilevered bi-metallic arm 170. The travel of the arm 170 is limited by stops 172 and 174. A kickdown apparatus, generally identified as 176, is also associated with the conduit 106 and thus with the output of the pump 152. The kickdown apparatus 176 comprises a normally closed valve member 178 registering with an orifice 179 in the conduit 106. The valve member 178 is supported by a cantilevered bi-metallic arm 180. The valve member 178 is resiliently urged toward the valve orifice 179 by a coil spring 186, and thus is normally closed until the core 182 of a solenoid 184 is energized by energizing the solenoid coil 188 by a kickdown switch (not shown) under the control of the driver of the vehicle.

The pressure control assembly 164, see especially FIG. 7, comprises a multiple part housing 200 comprising a first cup-shaped part 202, a second part 204, and a closure part 206, the part 206 being a support casting. The parts 204 and 206 are bolted together by headed bolts 210 while the part 202 is connected to a hose or conduit 218. The conduit 218 is connected at its opposite end to the fuel intake manifold 220 of the engine 36.

Within the part 202 and retained in position by the flanges 212 and 214 is a diaphragm 222 connected by a rivet 224 at its center to a cup-shaped spring retainer 226. The rivet 224 bears against a valve operating rod 227. A second spaced spring retainer 228 is connected at the opposite end of the part 202 and a coil spring 230 is positioned between the retainers 226 and 228. The spring 230 urges the diaphragm 222 and the rivet 224 against the rod 227. The valve operating rod 227 is slidably received in an inwardly extending neck 232 of the part 204.

A second diaphragm 236 is fixedly positioned between the parts 204 and 206 and is connected to a spring retainer 238 by a rivet 239. The rivet 239 bears against the rod 227. A coil spring 240 is positioned between the retainer 238 and the part 204. The interior of the part 204 is provided with a tube fitting 242 to which is connected a hose or conduit 244. The hose or conduit 244 is connected to a solenoid operated valve 246 associated with the forwardreverse shift mechanism 42.

A valve plunger 248 which seats on a valve seat 250 is associated with the assembly 164 and controls the pressure in the output or outlet conduit 162 from the pump 150, which conduit 162 also connects with a conduit 252 (see FIG. 3) a starting clutch engaging servo (not shown) as is known in the art. The valve plunger 248 is also provided with an orifice 254 and a cross passage 255 into which the orifice 254 opens (see detail FIG. 11). The rivet 239 bears against the valve plunger 248 and thus the plunger 248 is always urged toward the seat 250 by the spring 240 (the plunger acting as a poppet type relief valve under certain conditions) except when the forward and reverse mechanism is energizing the solenoid 246 admitting vacuum into the member 204 thereby overcoming the load on the spring 240. (While this indicates a hydraulic clutch, other types of clutches may be used within the scope of the invention.) The part 206 has a vent 255a to vent one side of the diaphragm 236. In the conduit 162 (see FIG. 3) is also an orifice 256 and a metering pin 258 controlled by a temperature responsive bi-metallic arm 260. One side of the metering pin 258 and the valve 248 is in a conduit 160A leading to the input of the pump 150. The combination of the orifice 254 and the orifice 256 generates the initial rise in the P curve of FIG. 6, which may be used to control a hydraulically controlled starting clutch as in the prior art.

FIG. 4 illustrates the spring 60 for the driveR pulley 12 with its radially inwardly directed fingers 66. The spring 60 is drivingly connected at spaced locations to the rim 62 of the pulley flange 44 by connecting means 64. The means 64 is also illustrated in FIGS. 8, 9 and 10 and each comprises a front member 262 spaced from a rear member 264, the members being suitably spaced and connected together.

The front member 262 has a threaded opening 266 to receive a set screw 268 and also an extension 270 which engages a member 272 having a projection 274 passing through an opening 276 in the rim 62. To avoid drilling holes in the fingers 66, the means 64 is slipped over a finger, moved outwardly to the position shown and the set screw 268 is tightened to effectively connect the disc spring 60 to the rim 62.

The disc spring 133 for the driveN pulley 14 with fingers 133a is essentially the same construction as the spring 60 and is connected in a similar fashion to the flange 124; however, because it must exert a load on the flange 124 and thus the belt 144 in excess of that provided by the driveR pulley 12, the spring 133 may be stacked, for example, it may be constructed with a plurality of disc springs, each having inwardly directed fingers.

As illustrated in the drawings but not specifically described are suitable O-ring seals. These are provided where necessary and desirable.

OPERATION

With the engine 36 idling and the clutch 38 released, the drive shaft will be at rest and the pulleys 12 and 14 will be in the positions of FIG. 1.

The pump 150 will be operating but due to the orifices 254 and 256 bypassing fluid to the intake port 156 the pressure will be at a very low value. If this pressure is used in a hydraulically controlled starting clutch, such as in U.S. Pat. No. 3,263,782, the pressure will be insufficient to overcome the retractor springs in the clutch which maintain the clutch in the release position. The pump 152 will also be operating but due to the fluid bypassing orifices 169 and 179, this pressure will also be at a very low value in the passage 106 and will be unable to overcome the retractive load of the spring 100 in the shift spool 97.

Therefore, the shift spool piston 94 and the follow-up valve 76 will be at the fully retracted position (to the right as shown in the drawings) which opens the passages 80 directly to the sump 86 via the groove 82 and the passage 84, thus maintaining zero pressure in the cavity 54 and on the driveR pulley piston 48. Because of its hydraulic and mechanical connections, the follow-up valve 76 is both speed and torque responsive. At this time, the piston 48 abuts the closure 52 to provide a reaction for the belt loading forces developed at the driveN pulley 14 (as before stated, a load is always maintained on the belt 144 by the driveN pulley 14).

To start the vehicle moving, the throttle of the engine (not shown) is opened and the engine rpm increases. The pump 150 delivers fluid pressure P in the manner indicated along the left portion of the curve (FIG. 6) which causes the clutch 38 to engage so as to connect the shafts 34 and 40. This causes the pulleys 12 and 14 to rotate and the driveN shaft 110 is rotated which starts the vehicle moving. The pump 152 delivers even a lower pressure at this stage of operation and the pressure is still insufficient in the passage 106 to start moving the shaft spool piston 94 to the left (as viewed in the drawings). Therefore, the driveR piston cavity 54 remains at zero pressure and connected to the sump 86 until some higher rpm is reached. The engine 36 and drive shaft 40 continue to turn together in the low drive ratio until the pressure G (see the rising portion of the pressure curve G, FIG. 6) becomes sufficient to initiate movement of the shift spool piston 94 and follow-up valve 76 to admit pressure into the driveR piston chamber 54.

Movement of the piston 94 and the pressure in the driveR piston chamber 54 on the piston 48 initiates movement of the driveR pulley flange 44 toward the flange 18. Movement of the flange 44 toward the flange 18 transmits additional tension to the belt 144 and forces the driveN flange 124 to move to the left, thereby changing the drive ratio between the pulleys. The resulting drive ratio will cause a feed-back signal (incremental change in engine RPM and G pressure which changes the force on the shaft spool 94) which will correct for any drift in RPM during the speed ratio change at a given torque level as additional load is placed on the engine. This results in the maintenance of a constant engine speed for a given torque level until the ratio change has been completed to the end of the travel of the driveR pulley piston 48 at which time the driveR flange 44 butts against the driveR pulley flange 18.

Continued operation at this torque level results in a constant overdrive ratio and varying engine speeds related directly to the vehicle speed. It will be seen from the curves of FIG. 5 that if this operation is at a 50% torque level, the opposing pressures (P) on the left hand side of the shift spool piston 94 will be moderate and consequently only a moderate RPM will be required to attain sufficient pressure in the passage 106 to balance the pressure on the opposite side of the shift spool piston 94 which results in a moderate engine RPM and constant engine speed operation through the ratio change phase. With increasing torque, higher values of G and higher RPM of the engine will be required to induce the ratio change, such that in addition to the increased torque provided at higher throttle openings, increased RPM is also provided, so that considerable flexibility in the power output is available.

Turning now to the follow-up valve, the annular groove 82 is connected to the sump 86 by the conduit 84 and the groove 88 is connected to the pump 150. The land between groove 82 and groove 88 straddles the delivery ports 80 into the delivery tube 70. The amount of pressure in the passage 90 which actually is delivered to the cavity 54 and the driveR piston 48 is the result of minute shifts in the position of the follow-up valve block 74 in relation to the movement of the piston 94 of the shift spool 97. A slight movement of the driveR pulley piston 48 to the left which tends to increase the effective diameter of the driveR pulley 12 and the position of the belt 144 will tend to dump pressure into the sump 86 through the passage 84 and communicate the openings 80 with the groove 82 and thereby nullify this initial movement. Conversely, any tendency of the belt 144 to move down to a smaller driving diameter (with the flanges 18 and 44 moving apart) will tend to admit more line pressure to the driveR piston cavity 54 and correct for this motion, so that the result is that the pressure in chamber 54 is regulated at all times at some value less than the available pressure in the line 162, whereas the pressure on the driveN assembly piston 134 is always directly connected to this source of pressure, i.e., line 162; thus a load is always maintained on the belt 144 by the driveN pulley.

The configuration of the metering pin 168 (in conduit 106) and the deflection rate of the bi-metallic leaf spring arm 170 is developed to produce the desired shape of pressure G (pump 152) versus engine RPM. The action of the bi-metal spring arm 170 with changes in oil temperature compensates for the change in oil viscosity, such that the G curve remains substantially the same over the operating range of oil temperatures. At higher temperatures the bi-metal spring arm 170 reaches the stop 174 after which the effective free length of the cantilever arm is reduced, so that the amount of compensation at higher temperatures is reduced in accordance with the smaller changes in oil viscosity encountered at higher temperatures. In other words, the viscosity of the oil changes quite rapidly from room temperature to 140° but from 140° to 200° it doesn't change nearly as much. On the opposite side of the bi-metal spring arm 170, the stop 172 shortens the effective cantilever length of the bi-metal spring 170 to cause the governor curve G to flex upward near the higher end of the engine operating speed range, so that a strong change in governor signal is provided near the top desired operating range of the engine to avoid the possibility of overspeeding the engine. The secondary bimetallic cantilever spring arm 180 and metering pin 178 is normally held closed by the solenoid core plunger 182 and its spring 186 but when maximum performance is desired, a kickdown switch (not shown) in the throttle linkage (not shown) closes at the full throttle position or just beyond the full throttle postion to energize the solenoid coil 188 and retract the core plunger 182 thereby allowing the cantilever/bi-metal spring 180 to provide an additional or auxiliary orifice and a maximum performance governor curve shown dotted in FIG. 6. The fluid then passes through both of the orifices 169, 179, and thereby increases the speed required at the pump 152 to reach the governor pressure which forces the belt 144 into the top overdrive ratio (FIG. 2). If at a given speed and torque condition, the follow-up valve 176 and the position of the belt 144 is in a certain position, operation of the kickdown switch will reduce the pressure from a solid curve to the level shown by the dotted curve thereby reducing the force on the right hand side of shift spool piston 94. The follow-up valve 76 will move to the right and relieve pressure in the chamber 54 causing the flange 44 of the driveR pulley to move to the right. The belt 144 then moves towards the bottom of the driveR pulley, changing the ratio of the drive toward low drive ratio. The spring 60 always provides a bias load on the flange of the driveR pulley 12 to squeeze the belt 144 but the bias load is insufficient by itself to overcome the tension of the belt produced by the driveN flange assembly 14.

Assuming the driver of the vehicle has been cruising at a certain speed at part throttle and wishes to accelerate by opening the throttle but not to the extent of going through the kickdown. Instead of changing the pressure G at the pump 152, the increase throttle causes a decrease in vacuum in the pressure control valve 164. This permits more of the spring pressure to be applied to that valve, thereby increasing the pressure to a higher level in the conduit 162 and on the left hand side of the shift spool piston 94 (in the cavity 98). This will cause the follow-up valve 76 to move to the right and the ports 80 will communicate to some extent with the groove 82 and thus the conduit 84 and the sump 86.

Some of the pressure in the chamber 54 will be relieved causing a shift in the belt position towards the lower drive ratio position.

I claim:
1. A variable pulley transmission for a vehicle comprising:
    a driver shaft;
    a driven shaft;
    a rotatable driver pulley connected to said driver shaft;
    driving means for rotating said driver shaft;
    said driver and driven pulleys each comprising an axially fixed flange and an axially movable flange;
    belt means drivingly connecting said pulleys;
    spring means operatively associated with said driver and driven axially movable flanges normally urging said movable flanges axially toward said driver and driven fixed flanges;
    hydraulic control means operatively associated with said pulleys to provide an additional load to the load of said spring means to thereby change the relative positions of the flanges of said pulleys and thus change the speed ratio therebetween;
    said hydraulic control means comprising:
    a pair of fixed displacement pumps, one of which provides pressure responsive to the speed of said driving means and the other of which provides pressure responsive to the torque of said driving means;
    a hydraulic cylinder and a piston in said cylinder;
    said driver pulley movable flange being connected to said piston;
    said cylinder being connected to said pump providing torque responsive pressure; and
    a speed and torque responsive valve in the connection between said pump providing said torque responsive pressure in said cylinder.
2. A variable pulley transmission as recited in claim 1 further comprising an engine vacuum responsive valve varying the pressure of the hydraulic fluid from said pump providing said torque responsive pressure to said cylinder.
3. A variable pulley transmission as recited in claim 1 in which said hydraulic control means comprises a shift spool, one side of which communicates with said pump providing said speed responsive pressure and the other side of which communicates with said pump providing said torque responsive pressure, said shift spool being connected to said valve to control the hydraulic pressure to said cylinder.

4. A variable pulley transmission as recited in claim 3 further including a spring means operatively associated with said shift spool and resiliently urging said shift spool in one direction.

5. A variable pulley transmission as recited in claim 3 wherein said valve comprises a block connected to said shift spool and a hollow valve member, said hollow valve member being connected to said piston connected to said axially movable pulley flange and having spaced ports therein, one port communicating with said hydraulic cylinder and the other port being connected with said pump providing said torque responsive pressure and said sump depending upon the axial position of said block relative to said hollow valve member.

6. A variable pulley transmission as recited in claim 3, further comprising means to control the pressure from said pump providing said speed responsive pressure, said means comprising an orifice and a metering pin for said orifice, and a temperature responsive means supporting said metering pin to compensate for temperature changes in hydraulic fluid.

7. A variable pulley transmission as recited in claim 6 in which said temperature responsive means is a bimetal member.

8. A variable pulley transmission as recited in claim 3 further comprising a solenoid operated valve to control the pressure from said pump providing said speed responsive pressure, said solenoid operated valve comprising an orifice and a valve member normally seated on said orifice, said valve member being operatively associated with the core of a solenoid and means to energize said core and unseat said valve member from said orifice.

9. A variable pulley transmission for a vehicle comprising:
   a driver shaft and a driven shaft;
   a rotatable driver pulley connected to said driver shaft and a rotatable driven pulley connected to said driven shaft, each pulley comprising an axially fixed flange and an axially movable flange;
   driving means for rotating said driver shaft;
   belt means drivingly connecting said pulleys;
   spring means operatively associated with said driver and driven axially movable flanges normally urging said movable flanges toward said driver and driven fixed flanges;
   said spring means operatively associated with said driven axially movable flange being so constructed and arranged to provide a higher load on said axially movable driven pulley than the spring means operatively associated with said axially movable driver pulley flange; and
   hydraulic control means which is speed and torque responsive operatively associated with said pulleys to change the relative positions of the flanges of said pulleys and thus change the speed ratio therebetween.

10. A variable pulley transmission as recited in claim 9 in which said driven pulley flanges are always spaced from one another to continuously maintain a load on said belt means.

11. A variable pulley transmission as recited in claim 9 further comprising an axially fixed housing member associated with each said pulley and in which each said spring connected at its periphery to its respective pulley flange, each said disc spring having a plurality of radially inwardly extending fingers, said fingers having inward terminal ends abutting said housing member associated with the respective pulley.

* * * * *